UNITED STATES PATENT OFFICE.

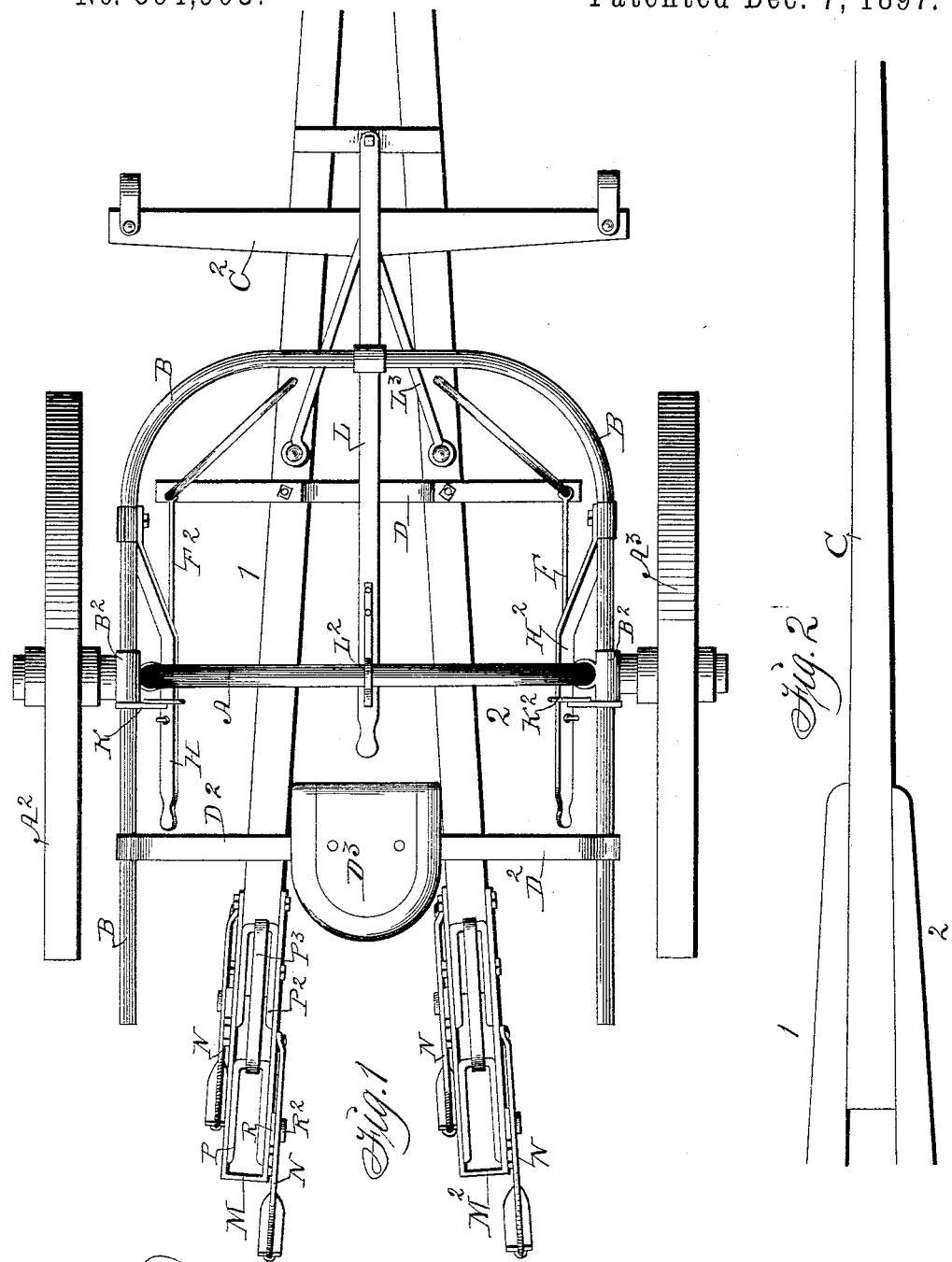

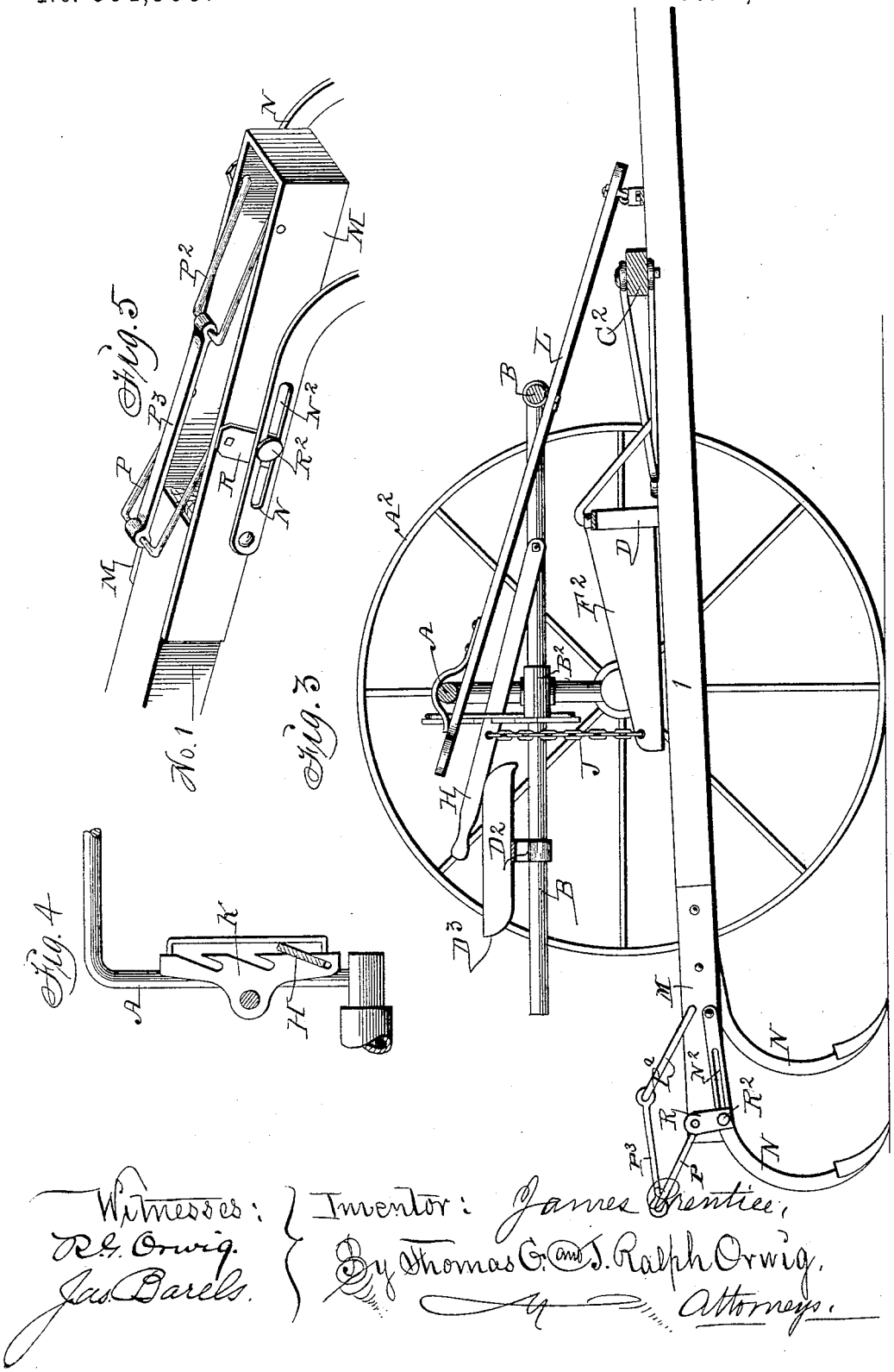

JAMES PRENTICE, OF COLESBURG, IOWA.

STRADDLE-ROW WHEEL-CULTIVATOR.

SPECIFICATION forming part of Letters Patent No. 594,903, dated December 7, 1897.

Application filed May 15, 1897. Serial No. 636,824. (No model.)

*To all whom it may concern:*

Be it known that I, JAMES PRENTICE, a citizen of the United States, residing at Colesburg, in the county of Delaware and State of Iowa, have invented a new and useful Straddle-Row Wheel-Cultivator, of which the following is a specification.

My object is, first, to utilize the weight of the operator on the seat as a counterbalance to facilitate the adjustment of the beams and shovels relative to the plants in crooked rows or obstructions in the line of advance; second, to govern the direction of the carriage and the lateral movements of the beams and shovels by means of a lever of the first order connected with the carriage-frame at some distance in front of the driver's seat; third, to jointly adjust the pole and beams and shovels relative to the seat laterally as required to change the direction of the line of advance and vertically as required to govern the positions of the shovels relative to the ground and the depth of their furrows; fourth, to provide a wide range of lateral adjustment of the shovels relative to plants and obstructions and the carriage-wheels as required to prevent damage to plants or the cultivator and also to facilitate turning about at the ends of rows of plants in the field, and fifth, to hinge the shovel-bearing standards to the beam to be raised and lowered at pleasure and locked rigidly to the beams when lowered into an operative position or elevated to be carried inoperative.

I accomplish the results contemplated by the construction, arrangement, and combination of a carriage, a suspended pole and beams, a support for a driver's seat, suspended swinging bars and chains for adjusting the beams and shovels laterally and raising and lowering them, levers for lifting the beams and racks for locking the levers, and means for hinging and adjusting and locking the shovel-standards to the beams, as hereinafter set forth, pointed out in my claims, and illustrated in the accompanying drawings, in which—

Figure 1 is a top view showing the form of the carriage-frame, the seat-support, and the beams carrying shovels suspended from the carriage-frame. Fig. 2 shows the pole and beam combined. Fig. 3 is a side view of the cultivator, showing the means employed for suspending and raising and lowering the beams and the lever for governing the direction of the carriage and adjusting the beams and shovels carried thereby relative to plants and obstructions in the line of advance. Fig. 4 is a detail view of one of the racks connected with the carriage-frame for supporting the beams at different elevations at different times. Fig. 5 is a perspective view of the device for hinging and locking the shovel-bearing standards to the rear ends of the beams and locking them in fixed operative and also in fixed elevated and inoperative position whenever desired.

The letter A designates an arched carriage-axle support upon mating wheels $A^2$ and $A^3$.

B is a U-shaped carriage-frame rigidly fixed to the inside portions of the parallel upright parts of the arched axle by means of couplings $B^2$ or in any suitable way.

C is the pole, and 1 and 2 are the shovel-bearing beams, fixed divergently to the rear end of the pole.

$C^2$ is the doubletree, pivotally connected with the beams for hitching horses to the beams.

D is an arched frame fixed to the beams to serve as a brace and also as a foot-rest for a person on the driver's seat.

$D^2$ is a leaf-spring fixed to the parallel parts of the U-shaped carriage-frame in rear of the arched axle A, and $D^3$ is a driver's seat fixed to the center of the spring.

F and $F^2$ are straight swing-bars pivoted to the ends of the frame D to extend horizontally rearward and swing laterally.

H and $H^2$ are hand-levers pivoted to the carriage-frame to extend rearward and near the seat $D^3$ and within the reach of a person on the seat. They are connected with the rear ends of the swing-bars F and $F^2$ by means of chains J and in such a manner that the beams 1 and 2 can be readily lifted thereby by a person on the seat.

K and $K^2$ are racks fixed to the upright parts of the arched axle A for retaining the levers F and $F^2$ at different elevations as required to regulate the depth of furrows made by the shovels and also as required to retain the beams and shovels elevated and inoperative whenever desired.

L is a lever of the first order fulcrumed to the front and center of the U-shaped carriage-frame and extends rearward and is slidingly connected at its rear portion with the top portion of the arched axle by means of a loop L² and pivotally connected with the front portions of the beams 1 and 2 by means of an arched cross piece and brace L³, fixed to the beams.

M and M² are quadrangular frames fixed to the rear ends of the beams 1 and 2. N are standards pivoted to the outside and front portions of the said frames.

P and P² are arched rock-shafts journaled in the same frames and connected at the tops of their arches by means of a link P³. Cranks R, fixed on these ends of the rock-shafts outside of the frames, are slidingly connected with the standards N by means of studs R², that project through slots N² in the standards in such a manner that when the rock-shafts P and P² are vibrated the standards and shovels attached to their lower ends will be raised and lowered. When the said rock-shafts are pressed forward to their limit of motion, as shown in Fig. 5, the shovels will be elevated and locked in an inoperative position, and a reverse motion of the device will lower and lock the standards as required to retain the shovels in an inoperative position.

From the foregoing description of the construction and function of each element and subcombination the complete operation and utility of my invention will be readily understood by persons familiar with the art to which it pertains.

I claim as my invention—

1. In a straddle-row wheel-cultivator, a U-shaped carriage-frame, an arched axle, a pole and shovel-bearing beams suspended from the axle and a lever fulcrumed to the front and center of the carriage-frame and slidingly connected with the arched axle and pivotally connected with the pole and beams, arranged and combined to operate in the manner set forth, for the purposes stated.

2. In a straddle-row wheel-cultivator, an arched carriage-axle on wheels, a U-shaped carriage-frame fixed to the parallel upright portions of the axle, a pole and two shovel-bearing beams rigidly joined and a lever pivotally connected with the pole and beams and fulcrumed to the front and center of the carriage-frame and slidingly connected with the top of the arched axle, bars pivoted to the beams to extend rearward and swing laterally, hand-levers pivotally connected with the carriage, chains connected with said levers and said pivoted swinging bars and means for fastening said levers at different points of elevation, arranged and combined to operate in the manner set forth for the purposes stated.

3. In a straddle-row wheel-cultivator, an arched carriage-axle on wheels, a U-shaped carriage-frame fixed to the paralled upright portions of the axle, a pole and two shovel-bearing beams rigidly joined and a lever pivotally connected with the pole and beams and fulcrumed to the front and center of the carriage-frame and slidingly connected with the top of the arched axle, bars pivoted to the beams to extend rearward and swing laterally, hand-levers pivotally connected with the carriage, chains connected with said levers and said pivoted swinging bars and means for fastening said levers at different points of elevation, racks fixed to the upright portions of the arched axle to lock the hand-levers in fixed positions and a seat-support fixed to the rear end portion of the carriage-frame, all arranged and combined to operate in the manner set forth, for the purposes stated.

4. In a straddle-row wheel-cultivator, an arched carriage-axle on wheels, a U-shaped carriage-frame fixed to the parallel upright portions of the axle, a pole and two shovel-bearing beams rigidly joined and a lever pivotally connected with the pole and beams and fulcrumed to the front and center of the carriage-frame and slidingly connected with the top of the arched axle, bars pivoted to the beams to extend rearward and swing laterally, hand-levers pivotally connected with said levers and said pivoted swinging bars and means for fastening said levers at different points of elevation, racks fixed to the upright portions of the arched axle to lock the hand-levers in fixed positions and a seat-support fixed to the rear end portion of the carriage-frame, a foot-rest fixed to the shovel-carrying beams and shovel-bearing standards adjustably connected with the rear ends of the beams, all arranged and combined to operate in the manner set forth for the purposes stated.

5. In a straddle-row cultivator, quadrangular frames fixed to the rear ends of the beams, arched rock-shafts journaled in said frames and linked together at their tops, cranks on the ends of the rock-shafts outside of said frames, shovel-bearing standards pivoted to the same frames and provided with slots and studs on the ends of the cranks extended through the slots, to raise and lower and lock the standards in the manner set forth for the purposes stated.

6. A straddle-row wheel-cultivator, comprising an arched carriage-axle on wheels, a U-shaped carriage-frame fixed to the parallel upright portions of the axle, a pole and two shovel-bearing beams rigidly joined and a lever pivotally connected with the pole and beams fulcrumed to the front and center of the carriage-frame and slidingly connected with the top of the arched axle, bars pivoted to the beams to extend rearward and swing laterally, hand-levers pivotally connected with said levers and said pivoted swinging bars and means for fastening said levers at different points of elevation, racks fixed to the upright portions of the arched axle to lock the hand-levers in fixed positions and a seat-support fixed to the rear end portion of the carriage-frame, a foot-rest fixed to the shovel-carrying beams and shovel-bearing standards adjustably connected with the rear ends of the beams, quadrangular frames fixed to the rear ends of the beams, arched rock-shafts journaled in the frames and linked together at their tops, cranks on the ends of the rock-shafts, shovel-bearing standards having slots or bridles pivoted to the frames and studs fixed to the cranks to enter and traverse the slots, all arranged and combined to operate in the manner set forth, for the purposes stated.

JAMES PRENTICE.

Witnesses:
REINERT THOMPSON,
C. E. SHAFFER.